United States Patent [19]
Engle

[11] Patent Number: 6,085,875
[45] Date of Patent: *Jul. 11, 2000

[54] WEDGE-SHAPED DISC BRAKE SHOE

[75] Inventor: Thomas H. Engle, Clayton, N.Y.

[73] Assignee: Westinghouse Air Brake Company, Wilmerding, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,200

[22] Filed: Nov. 12, 1996

[51] Int. Cl.[7] .................................................... F16D 63/00
[52] U.S. Cl. ..................................... 188/70 R; 188/250 E
[58] Field of Search ........................... 188/52, 58, 250 E, 188/70 R, 250 G

[56] References Cited

U.S. PATENT DOCUMENTS

| | | | |
|---|---|---|---|
| 2,213,383 | 9/1940 | Canfield | 188/70 R |
| 2,242,048 | 5/1941 | Ash | 188/70 R |
| 2,582,755 | 1/1952 | Kenny | 188/70 R |
| 3,033,320 | 5/1962 | Edwards | 188/70 R |
| 3,146,859 | 9/1964 | Schmid | 188/70 R |

*Primary Examiner*—Matthew C. Graham
*Attorney, Agent, or Firm*—James Ray & Associates

[57] ABSTRACT

The invention is a brake shoe for application to the rim of a brake disc for retarding a rotary motion of the brake disc. The brake shoe has one or more brakepads having a pair of pad friction surfaces for contact with friction surfaces on the brake disc. The pair of pad friction surfaces are sloped in opposition to each other, and have an open space located between the pad friction surfaces. The brake shoe has a pad support structure to which the brakepad or brakepads are attached, the pad support structure serving to press the brake pad or brakepads against the friction surfaces on the brake disc. The pad support structure has a portion thereof for mounting on a device for positioning the brake shoe and for moving the brakepad or brakepads into engagement with the disc.

10 Claims, 2 Drawing Sheets

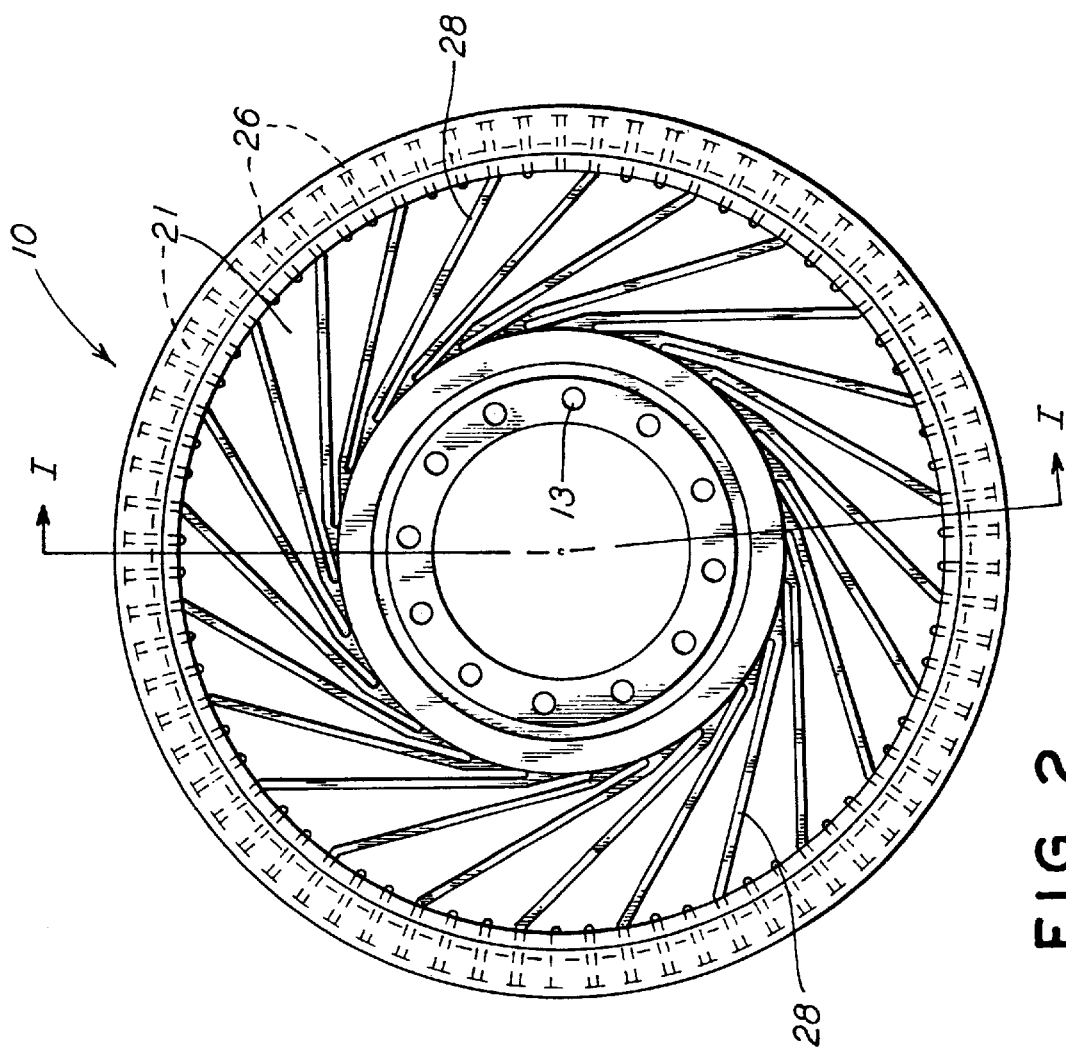
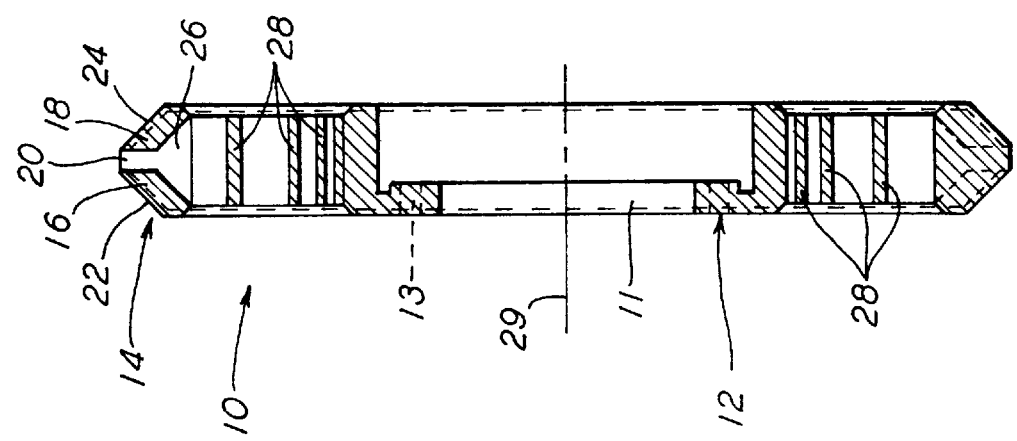

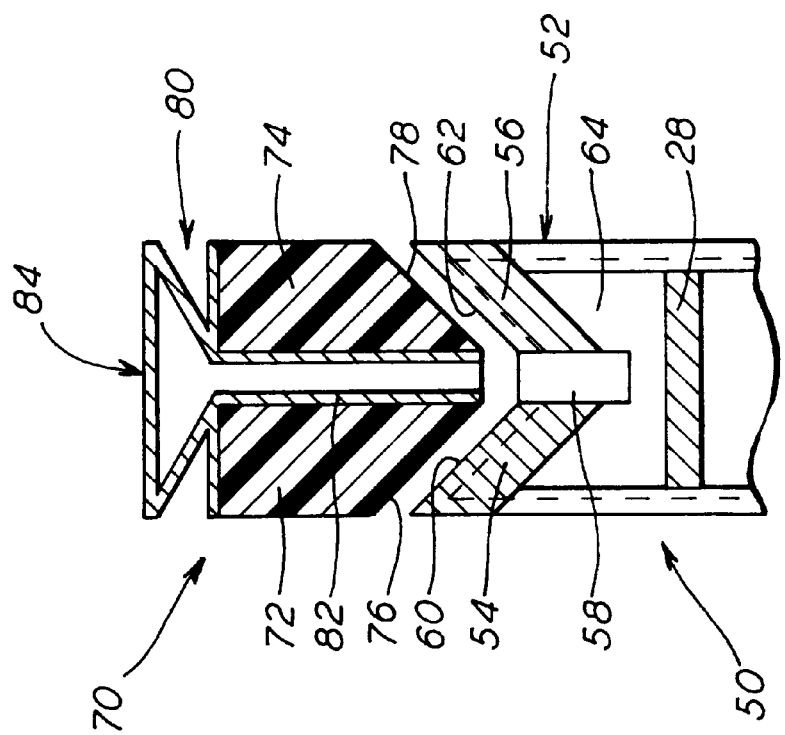
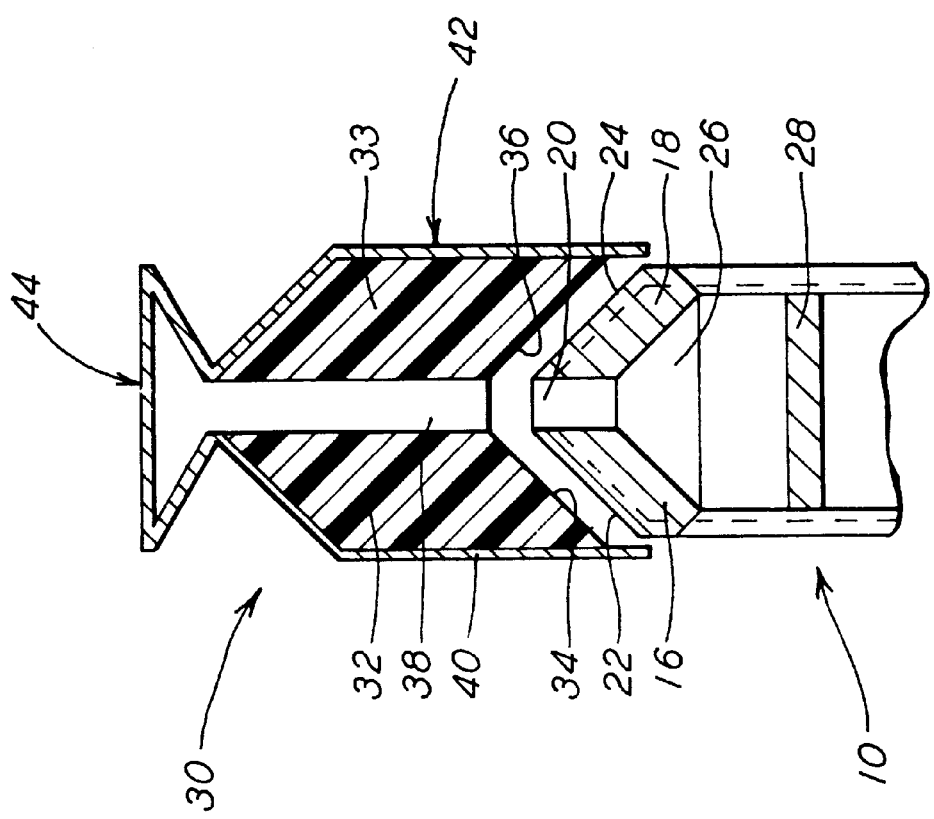

WEDGE-SHAPED DISC BRAKE SHOE

CROSS REFERENCE TO RELATED APPLICATION

The invention taught in this patent application is closely related to the invention taught in the following co-pending patent application: Cooling Spoke Arrangement For A Brake Disc, Ser. No. 08/745,429. The referenced patent application is being filed concurrently with the present application, and is assigned to the assignee of the present invention. Its teachings are incorporated into the present application by reference thereto.

FIELD OF THE INVENTION

The present invention relates, in general, to a brake shoe for a disc brake system for retardation of rotating machinery, and, more particularly, the invention relates to a brake shoe for a disc brake system for railway vehicles.

BACKGROUND OF THE INVENTION

The art of railway brakes includes two methods of retarding a railroad vehicle. One method is to provide brake shoes which may be pressed against the wheels of the railroad vehicle, to provide a friction force which retards the wheels. A second method is to attach a disc to a wheel or to an axle of the vehicle, and press brake shoes against the disc, thereby providing a friction force which retards the disc and hence retards the wheels. In the first of these methods, heat is absorbed by the thermal mass of the wheels, and then dissipated to the environment by conduction, convection, and radiation from the wheels. In the second of these methods, heat is absorbed by the brake discs, and then dissipated to the environment by conduction, convection, and radiation from the discs.

In both cases, the amount of energy which can be absorbed is limited by the temperatures generated, since high temperatures may damage the brake shoes, or cause thermal stresses which cause cracking of the wheels or brake discs. In some systems, the two methods are combined so that some of the heat is absorbed by the wheels, and some is absorbed by the discs. By combining the two methods, more heat can be absorbed than can be absorbed by either method separately.

In some systems employing disc brakes, brake shoes are applied to the rims of the brake discs. In others, brake shoes are applied to the faces of the discs. Application to the rim has an advantage over application to the face because the radius at which the friction force is generated is greater when it is applied to the rim than when it is when it is applied to the face. Hence, the retarding torque exerted on the brake disc is greater when the shoe is applied with a given force to the rim than when the shoe is applied with the same force to the face.

For a railway vehicle, it is particularly important to apply the brake shoe at as great a radius as possible because the radius of the disc is limited by the required track clearance. In the United States, this is 2.75 inches, so the radius of the brake disc must be at least 2.75 inches less than the radius of the wheel tread.

It is generally desirable for a brake system to provide a system for applying pressure to the brake shoe which provides mechanical advantage to amplify the total normal force between the brake shoe and the surface being retarded. For a brake shoe applied to the rim of a brake disc, prior attempts to accomplish this have been made by having the braking surface of the brake shoe have the form of a wedge, which is applied to a groove on the rim of the brake disc. With this configuration, the total normal force between the brake shoe and the brake disc is greater than the inward radial force applied to the shoe. An example of this is provided by U.S. Pat. No. 2,422,004.

Such configurations, however, are badly affected by tolerance in the position of the brake shoe relative to the brake disc in the direction of the axis of the brake disc. Variations in the exact relative axial positions of the brake shoe and the brake disc cause the apex of the wedge and the bottom of the groove on the brake disc to become rounded as wear occurs. Hence, some surface is produced at the apex of the wedge and the bottom of the groove which is not inclined relative to the radius. A portion of the inward radial force applied to the brake shoe is then borne by this surface, and for this portion of the shoe force, the normal force is not amplified. Hence, after some wear occurs, such a brake looses efficiency.

Furthermore with such a configuration, wear material from the brake pad may become trapped between the brake shoe and the brake disc and interfere with proper braking.

Heat generated at the friction surface of the brake disc must flow through the material of the brake disc until it reaches a surface which is cooled by the air, and/or cooled by radiation. Allowable braking forces must be limited to prevent excessive temperatures which would destroy the pad material, or cause cracking of the brake disc.

SUMMARY OF THE INVENTION

The present invention provides a brake shoe to be pressed against a brake disc having axisymmetric friction surfaces sloped relative to an axis of the brake disc in opposition to each other, the axisymmetric friction surfaces for contact with the brake shoe. The brake shoe of the present invention has at least one brakepad having a pair of pad friction surfaces sloped in opposition to each other, and having an open space located between the pair of pad friction surfaces. The brake shoe also has a pad support structure to which the brakepad or brakepads is or are attached, the pad structure for pressing the at least one brakepad against the axisymmetric friction surfaces of the disc. The pad support structure has a mounting means for attachment to a means for positioning the brakepad and moving it into engagement with the disc.

OBJECTS OF THE INVENTION

It is, therefore, one of the primary objects of the present invention to provide a brake shoe to be pressed against a brake disc attached to rotating machinery for retardation of the rotating machinery in which the brake shoe is for application to a friction surface on the rim of the brake disc in order to maximize the retarding torque on the brake disc caused by friction with the brake shoe.

It is an additional object of the present invention to provide a brake shoe having friction surfaces inclined at angles relative to a radial direction of a brake disc to which the shoe is applied, so that the total normal force between the brake shoe and the disc is greater than the inward radial force with which the shoe is pressed against the disc.

It is yet another object of the present invention to prevent the inclined friction surfaces from becoming worn in a manner which creates some surfaces which are not inclined, and which therefore provide no amplification of the total normal force.

It is still another object of the present invention to prevent wear material caused by wear of the pad to build up at an intersection of the inclined friction surfaces which would otherwise interfere with proper braking.

It is a further object of the present invention to provide a short path from the friction surface on the brake disc to a surface which is cooled by air or by radiation, to allow increases in the allowable braking forces.

In addition to the various objects and advantages of the present invention which have been generally described above, there will be various other objects and advantages of the invention that will become more readily apparent to those persons who are skilled in the braking art from the following more detailed description of the invention, particularly, when such detailed description is taken in conjunction with the attached drawing figures and with the appended claims.

BRIEF DESCRIPTION OF THE DRAWINGS

FIG. 1 shows a cross section cut along a diameter of a brake disc to which the present invention may be applied.

FIG. 2 shows an axial view of the disc of FIG. 1, and shows the section on which FIG. 1 is cut.

FIG. 3 shows the outer portion of the brake disc of FIG. 1 to which the present invention may be applied, and a brake shoe of the present invention which may be applied to it.

FIG. 4 shows the outer portion of an alternative brake disc, and an alternative embodiment of the invention, which is a brake shoe which may be applied to the alternative brake disc.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

FIG. 1 and FIG. 2 show a brake disc to which the present invention may be applied. FIG. 2 shows a view looking parallel to the axis of the disc. This figure locates Section A—A, which is the diametral section shown in FIG. 1. The brake disc is generally denoted 10. It has a hub portion 12 and a rim portion 14, which are connected by spokes 28. The hub portion 12 has bolt holes 13 for attachment to rotating machinery which the disc is to retard, and it may have a central opening 11 to pass over a shaft or axle of rotating machinery to which it is attached.

Rim portion 14 has a first annular portion 16 and a second annular portion 18. It may have a gap 20 and radial air passages 21 between first annular portion 16 and second annular portion 18. First annular portion 16 has a sloped first friction surface 22, and second annular portion 18 has a sloped second friction surface 24. Vanes 26 are located in gap 20, and they connect first annular portion 16 to second annular portion 18. Cooling of the vanes 26, the first annular portion 16, and the second annular portion 18 occurs by radial air flow through the air passages 21. Heat conducted into the spokes 28 from the vanes 26 is removed by airflow past the spokes and by radiation from the spokes. The axis 29 of the disc 10 is shown in FIG. 1.

FIG. 3 shows a radial section of the outer portion of disc 10, and a brake shoe 30 of the present invention, which may be applied to disc 10. First annular portion 16 having first friction surface 22 is shown, as is the second annular portion 18 having second friction surface 24. The section is cut through spoke 28 and vane 26. A portion of the gap 20 between the first annular portion 16 and the second annular portion 18 is shown.

Brake shoe 30 of the present invention, which is for application to a brake disc such as brake disc 10, has first brake pad 32 and second brake pad 33. Pad 32 has wear surface 34 and pad 33 has wear surface 36. Brake pads 32 and 33 are supported by pad support structure 40 which has side portions 42 and mounting means 44. Brake pads 32 and 33 are separated by open space 38. Open space 38 is substantially devoid of structure, and is sufficiently large that it prevents the buildup of wear debris. It also prevents the formation of surfaces which are not inclined relative to the radius of brake disk 10.

When brake shoe 30 is pressed radially inward against brake disc 10, first pad friction surface 34 contacts first friction surface 22, and second pad friction surface 36 contacts second friction surface 24. Because the friction surfaces 22 and 24 and the pad friction surfaces 34 and 36 are sloped as shown, the normal pressure integrated over the contacting sloped surfaces exceeds the force with which brake shoe 30 is pressed inward. This excess of the normal pressure causes an increase of the friction force between the shoe 30 and the disc 10. Hence, with this sloped configuration, the braking torque which disc 10 applies to the rotating machinery (not shown) to which it is attached is increased. Axial forces between disc 10 and shoe 30 caused by the sloped friction surfaces 22, 24, 34 and 36 cancel out because surfaces 22 and 34 are sloped in opposition to surfaces 24 and 36.

It should be noted that this presently most preferred embodiment of the invention is for the brake disc shown which has a rim portion 14 in which the friction surfaces 22 and 24 are sloped so as to have the general form of a ridge, with gap 20 cut out of its center. FIG. 3 illustrates brake shoe 30 of this embodiment of the present invention which is for application to this disc. Brake shoe 30 has the general form of a groove, with open space 38 cut out of its center.

FIG. 4 illustrates an alternative embodiment of the present invention. This alternative embodiment of the present invention is for application to brake disc 50, which has a rim portion 52 shown in FIG. 4, and a hub portion (not shown) similar to hub portion 12 of the disc 10 to which the previously described embodiment of the present invention is applied. Disc 50 may have spokes (not shown) similar to spokes 28 of the disc 10 to which the previously described embodiment of the present invention is applied.

However, brake disc 50 has first alternative annular portion 54 and second alternative annular portion 56 sloped so that first alternative friction surface 60 and second alternative friction surface 62 form a groove with cut away center 58.

FIG. 4 shows an embodiment of the present invention, which is an alternative brake shoe 70 for pressing against disc 50 to retard disc 50.

Alternative shoe 70 has first alternative pad 72 and second alternative pad 74. These are separated by alternative central open space. Open space 79 is substantially devoid of structure. Preferably, the only structure is inner portion 82 of pad support structure 80, which is preferably a thin layer. Open space 79 is sufficiently large that it prevents the buildup of wear debris. It is also large enough to prevent the formation of surfaces which are not inclined relative to the radius of brake disk 50. 79. First alternative pad 72 has first alternative pad friction surface 76 and second alternative pad 74 has second alternative pad friction surface 78. Alternative pads 72 and 74 are held by alternative pad support structure 80, which has inner portion 82 and mounting means 84. Axial forces between disc 50 and shoe 70 caused by the sloped friction surfaces 60, 62, 76, and 78 cancel out because surfaces 60 and 76 are sloped in opposition to surfaces 62 and 78.

Now, discussing the invention more broadly, there is disclosed a brake shoe 30 or 70 for application to a brake disc 10 or 50 which has a pair of axisymmetrical disc friction surfaces 22 and 24 or 60 and 62 which are sloped relative to the axis of the disk, and are sloped in opposition to one another.

The brake shoe has at least one brakepad 32, 33, 72, or 74 having pad friction surfaces 34, 36, 76 or 78 separated by an open space 38 or 79. The pad friction surfaces 34 and 36 or 76 and 78 are sloped in opposition to one another. These are for contact with the disc friction surfaces 22 and 24 or 60 and 62.

The brake shoe has a pad support structure 40 or 80 to which the brakepads 32,33,72, or 74 are attached. The pad support structure 40 or 80 is for pressing the brakepads 32 and 33, or 72 and 74 against the disc friction surfaces 22 and 24 or 60 and 62. The pad support structure has a mounting means 44 for attachment to a means for positioning the brakeshoe and for pressing it into engagement with the disc 10 or 50.

The pair of pad friction surfaces 34 and 36 or 76 and 78 may be concave surfaces which are portions of axisymmetric surfaces axisymmetric about an axis of the shoe 30 or 70, which lies outside of the shoe 30 or 70, and which, when the shoe 30 or 70 is engaged with the disc 10 or 50, lies approximately along the axis 29 of the disc 10 or 50. The pair of pad friction surfaces 34 and 36 or 76 and 78 may have radii of curvature approximately the same as the radii of curvature of the axisymmetric disc friction surfaces 22 and 24 or 60 and 62.

The open space 38 between the pair of pad friction surfaces 34 and 36, or the open space 79 between the pair of pad friction surfaces 76 and 78 may be oriented in a circumferential direction, relative to the axis of the shoe 30 or 70.

The open space 38 between the pair of pad friction surfaces 34 and 36, or the opening 79 between the pair of pad friction surfaces 76 and 78 may be sufficiently large to prevent buildup of brake shoe wear debris.

The open space 38 between the pair of pad friction surfaces 34 and 36, or the open space 79 between the pair of pad friction surfaces 76 and 78 may be sufficiently large to prevent formation of surfaces not inclined relative to the axis 29 of the brake disc 10 or 50 by wear of the pad friction surfaces 34 and 36 or 76 and 78, or by wear of the disc friction surfaces 22 and 24 or 60 and 62.

Generally, to provide this feature, the open space 38 between the pair of pad friction surfaces 34 and 36, or the open space 79 between the pair of pad friction surfaces 76 and 78 should be greater than the tolerance in positioning of the brakeshoe 30 or 70 in a direction parallel to the axis of the disc 10 or 50.

For example, in a railway braking application, the open space 38 or 79 should exceed the tolerance in lateral position of the brakebeam, which positions the brakeshoe 30 or 70.

The pair of pad friction surfaces 76 and 78 of brake shoe 70 may be so disposed relatively to each other that they have the form of a ridge, the apex portion of the ridge being cut away to form open space 79.

The pair of pad friction surfaces 34 and 36 of brake shoe 30 may be so disposed relatively to each other that they have the form of a groove, the bottom portion of the groove being cut away to form open space 38.

Open space 38 or 79 may be open to the atmosphere surrounding the brake shoe to permit air flow through the open space. The open space 38 or 79 may communicate with an open space in the mounting means 44.

The pad support structure 80 of the brake shoe 70 may have a portion 82 located between brakepad 72 or 74 and open space 79 to support brakepad 72 or 74 against motion into open space 79, and it may have a portion 81 located in a radially outward position relative to the axis of brake shoe 70 to press in a radially inward direction on brakepad 72 or 74.

The pad support structure 40 of the brake shoe 30 may have a portion 42 located next to brakepad 32 or 33 to support brakepad 32 or 33 against motion parallel to the axis of brake shoe 30, and it may have a portion 43 located in a radially outward position relative to the axis of brake shoe 30 to press in a radially inward direction on brakepad 32 or 33.

The open space 38 of brakeshoe 30 may have a dimension measured parallel to the axis of brakeshoe 30 which is at least 5 percent of the dimension of brakeshoe 30 measured parallel to the axis of brakeshoe 30, and the open space 79 of brakeshoe 70 may have a dimension measured parallel to the axis of brakeshoe 70 which is at least 5 percent of the dimension of brakeshoe 70 measured parallel to the axis of brakeshoe 70.

The dimension of brakepad 32 or 33 measured in the radial direction relative to the axis of brakeshoe 30 may be at least 20% of the radial dimension of brakeshoe 30, and the dimension of brakepad 72 or 74 measured in the radial direction relative to the axis of brakeshoe 70 may be at least 20% of the radial dimension of brakeshoe 70.

I claim:

1. A brake shoe for application to a brake disc, such brake disc having a pair of axisymmetric disc friction surfaces sloped relative to an axis of such brake disc, such disc friction surfaces sloped in opposition to one another and spaced apart axially from one another, said brake shoe comprising:

(a) a generally U-shaped pad support structure having a pair of substantially planar and substantially parallel inner surfaces, and a pair of substantially planar and substantially parallel outer surfaces, each respective pair of substantially planar and substantially parallel inner and outer surfaces being spaced apart axially relative to said axis of said brake disc;

(b) a pair of brakepads attached to one of said pair of substantially planar and substantially parallel inner surfaces and said pair of substantially planar and substantially parallel outer surfaces and spaced apart axially relative to said axis of said brake disc, each of said brakepads having a substantially trapezoidal cross section in a plane normal to a circumferential direction of such brake disk, said pair of brakepads having a pair of pad friction surfaces sloped in opposition to each other for contacting such pair of disc friction surfaces; and a pad support structure mounting means for securing said pad support structure to a means for positioning and moving said brakeshoe into engagement with such disc.

2. A brake shoe according to claim 1 wherein said pair of pad friction surfaces are concave pad friction surfaces which are portions of axisymmetric surfaces axisymmetric about an axis of said shoe, said axis of said shoe external to said shoe, said pair of pad friction surfaces having radii of curvature matching a radius of curvature of such axisymmetric disc friction surfaces.

3. A brake shoe according to claim 2 wherein a dimension of said pair of brake pads measured in a radial direction relative to said axis of said shoe is at least 20% of a dimension of said shoe measured parallel to said axis of said shoe.

4. A brake shoe according to claim 2 wherein at least one portion of said pad support structure is disposed in a radially outward direction relative to and adjacent to said pair of brakepads, said radially outward direction being a direction away from said axis of said shoe, to press in a radially inward direction on said brakepad.

5. A brake shoe according to claim 2 wherein said pair of brakepads are spaced apart a distance equal to at least 5 percent of a dimension of said shoe measured parallel to said axis of said shoe.

6. A brake shoe according to claim 1 wherein said pair of brakepads are attached to said substantially planar and substantially parallel outer surfaces of said pad support structure, and wherein said pair of pad friction surfaces are sloped away from each other.

7. A brake shoe according to claim 6 wherein said pad support structure has a pair of portions disposed radially outward from said brakepads.

8. A brake shoe according to claim 1 wherein said pair of brakepads are attached to said substantially planar and substantially parallel inner surfaces of said pad support structure, and said pair of pad friction surfaces are sloped towards each other.

9. A brake shoe according to claim 1 wherein said two brakepads are spaced apart sufficiently to prevent buildup of brake shoe wear debris.

10. A brake shoe according to claim 1 wherein said two brakepads are spaced apart sufficiently to prevent formation of surfaces not inclined relative to such axis of such brake disc by wear of said pad friction surfaces and such disc friction surfaces.

* * * * *